(12) United States Patent
Shi

(10) Patent No.: US 11,080,016 B2
(45) Date of Patent: Aug. 3, 2021

(54) SPEECH-BASED INTERACTION WITH A DISPLAY WINDOW

(71) Applicant: BANMA ZHIXING NETWORK (HONGKONG) CO., LIMITED, Kowloon (HK)

(72) Inventor: Shanwen Shi, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 0 days.

(21) Appl. No.: 16/451,954

(22) Filed: Jun. 25, 2019

(65) Prior Publication Data

US 2019/0317725 A1 Oct. 17, 2019

Related U.S. Application Data

(63) Continuation-in-part of application No. PCT/CN2017/118429, filed on Dec. 26, 2017.

(30) Foreign Application Priority Data

Jan. 5, 2017 (CN) .......................... 201710007951.5

(51) Int. Cl.
*G06F 3/16* (2006.01)
*G10L 15/22* (2006.01)

(52) U.S. Cl.
CPC .............. *G06F 3/167* (2013.01); *G10L 15/22* (2013.01)

(58) Field of Classification Search
CPC .................................... G06F 3/167; G06F 3/16
See application file for complete search history.

(56) References Cited

U.S. PATENT DOCUMENTS

| | | | |
|---|---|---|---|
| 6,882,974 B2 | 4/2005 | James | |
| 7,426,467 B2 | 9/2008 | Nashida | |
| 7,962,344 B2 | 6/2011 | Sharpe | |
| 8,519,909 B2 | 8/2013 | Gomez | |
| 9,575,720 B2 | 2/2017 | Faaborg | |
| 9,733,895 B2 | 8/2017 | Kim | |
| 9,990,177 B2 | 6/2018 | Faaborg | |
| 2003/0158736 A1* | 8/2003 | James | G06F 3/167 704/270.1 |
| 2004/0044523 A1* | 3/2004 | Sakai | H04M 3/4938 704/201 |
| 2009/0253463 A1* | 10/2009 | Shin | H04M 1/72563 455/563 |
| 2013/0342457 A1 | 12/2013 | Cox | |

(Continued)

FOREIGN PATENT DOCUMENTS

| | | |
|---|---|---|
| CN | 105653164 | 6/2016 |
| CN | 103869931 | 2/2017 |

*Primary Examiner* — Justin S Lee
(74) *Attorney, Agent, or Firm* — Van Pelt, Yi & James LLP

(57) ABSTRACT

Speech-based interaction with a display window is disclosed, including: receiving speech input with respect to a display window that is presented at a device; converting the speech input into an operation instruction; determining an interface element of the display window that corresponds to the operation instructions, including by querying interface element information corresponding to the display window; and activating the interface element of the display window based at least in part on simulating a manual selection event with respect to the interface element of the display window.

18 Claims, 7 Drawing Sheets

(56) References Cited

U.S. PATENT DOCUMENTS

| | | | | |
|---|---|---|---|---|
| 2014/0188471 A1* | 7/2014 | Haughay | ............. | G06F 3/167 |
| | | | | 704/246 |
| 2015/0340025 A1* | 11/2015 | Shima | ............. | G10L 17/22 |
| | | | | 704/246 |
| 2016/0322048 A1* | 11/2016 | Amano | ............. | G10L 15/32 |
| 2017/0047064 A1* | 2/2017 | Kirihara | ............. | G10L 15/22 |
| 2018/0060029 A1* | 3/2018 | Kogan | ............. | G06F 16/951 |

* cited by examiner

SPEECH-BASED INTERACTION WITH A DISPLAY WINDOW

CROSS REFERENCE TO OTHER APPLICATIONS

This application is a continuation-in-part of and claims priority to International (PCT) Application No. PCT/CN2017/118429, entitled VOICE-BASED INTERACTION METHOD AND APPARATUS, ELECTRONIC DEVICE, AND OPERATING SYSTEM filed on Dec. 26, 2017 which is incorporated herein by reference in its entirety for all purposes, which claims priority to China Patent Application No. 201710007951.5, entitled SPEECH-BASED INTERACTIVE METHOD, MEANS, ELECTRONIC DEVICE AND OPERATING SYSTEM filed on Jan. 5, 2017 which is incorporated by reference in its entirety for all purposes.

FIELD OF THE INVENTION

The present application relates to a voice-based interaction with a user interface.

BACKGROUND OF THE INVENTION

Speech is the mode of communication habitually used by humans. It not only comes more naturally than most other methods of communication, but it also has the advantages of having a small cognitive load, occupying few resources, and providing a high interaction efficiency. With the successful application of technology such as Hidden Markov Models (HMM) and artificial neural networks to implement speech recognition, speech has become a powerful way to perform interactions and has therefore been broadly applied to personal computers, mobile communication terminals, and various other electronic devices. Through using speech-based commands, a user may execute queries, perform searches, make telephone calls, and perform other necessary operations on an electronic device in a manner that is convenient to the user.

Existing modes of speech-based interaction with electronic devices generally require customizing the application programs that support speech operations. The following is an example of a conventional speech-based interaction process: after displaying a window that supports speech operations through a customized application program, a speech instruction set that is supported by the window is registered with a speech service provided by the operating system. If, after receiving speech information input by the user, the speech service detects that the speech information matches a speech instruction in the speech instruction set registered with the application program, the speech service converts the speech information into a corresponding control instruction, which it sends to the corresponding window of the application program. The application program responds through executing pre-customized code. When the application program exits the window that supports the speech operations, the speech service cancels the corresponding set of speech instructions at the speech service.

As such above, with existing implementations of speech interaction, in order for a window of an application program to support speech interaction, it will be necessary to add operational logic for that window in at least the three areas below: registering a speech instruction set, canceling a speech instruction set, and using a received control instruction as a basis to perform corresponding processing. If two or more windows in an application program are to support speech operations, the application developer will have to execute the customized operations described above for each window. As a result, the work load for implementing speech-based control at each window of an application program is generally quite large, which creates difficulties for existing application programs to provide complete speech operations support. The labor involved in adding speech-based control to application programs has become an obstacle to the promotion and application of speech interaction with electronic devices.

SUMMARY OF THE INVENTION

The present application discloses techniques comprising: receiving speech input with respect to a display window that is presented at a device; converting the speech input into an operation instruction; determining an interface element of the display window that corresponds to the operation instructions, including by querying interface element information corresponding to the display window; and activating the interface element of the display window based at least in part on simulating a manual selection event with respect to the interface element of the window display

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of providing speech-based interaction with a display window are described herein. A speech input with respect to a display window that is presented at a device is received at the device. The speech input is converted into an operation instruction device. An interface element of the display window is determined, including by querying interface element information corresponding to the display window. The interface element of the display window is activated based at least in part on simulating a manual selection event with respect to the interface element of the display window.

Figure 1:
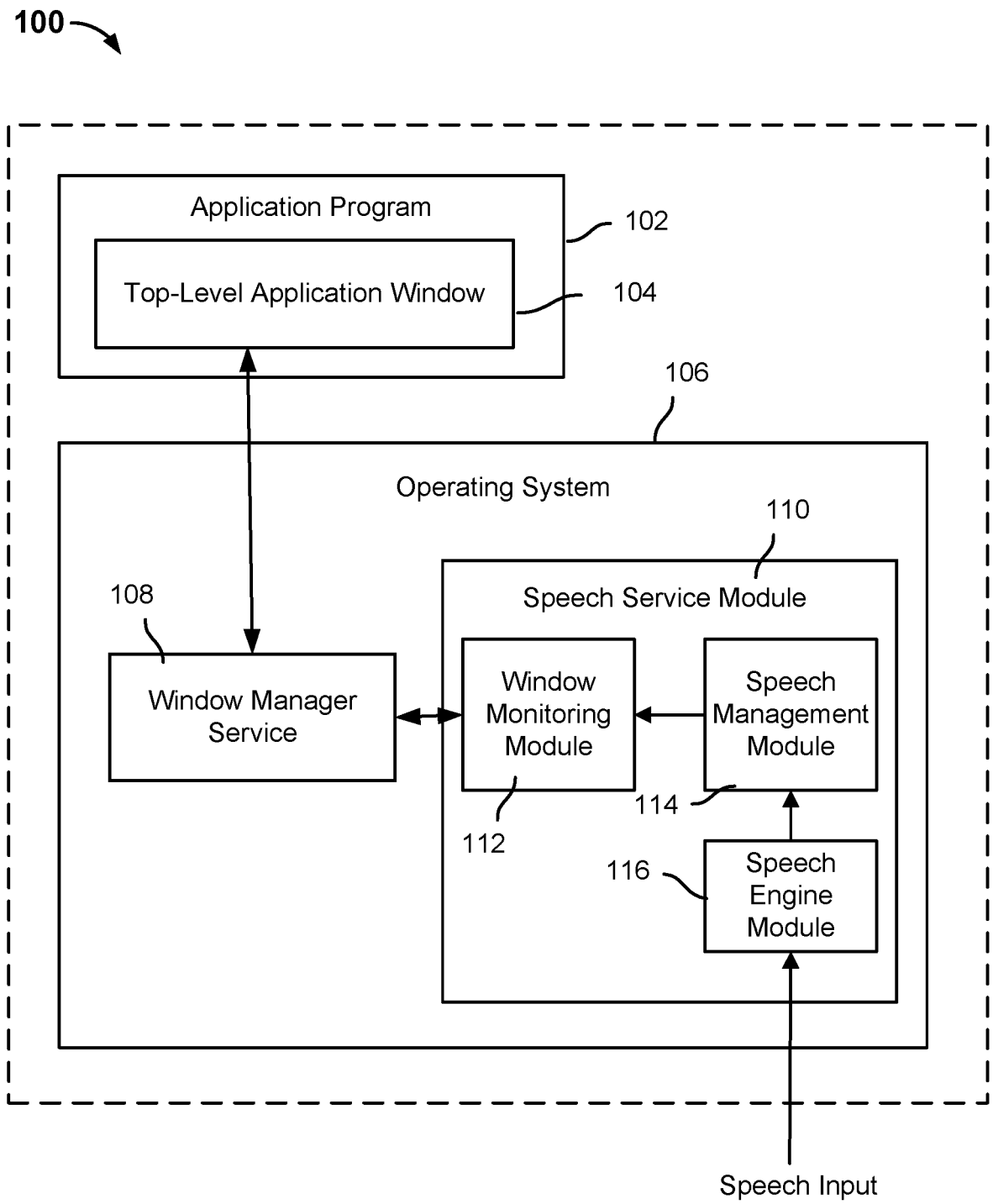
FIG. 1 is a diagram showing an example of a device for providing speech-based interaction with a display window.

FIG. 1 is a diagram showing an example of a device for providing speech-based interaction with a display window.

Device 100 comprises a device that has a sound/voice detecting sensor (e.g., a microphone) and also a display screen. For example, device 100 may be a mobile communication device (e.g., a smart phone), a personal computer, a tablet, or a vehicle-mounted electronic device applied to an Internet-connected vehicle.

Device 100 includes application program 102, of which top-level application window 104 is currently being displayed at the display screen of device 100. In various embodiments, top-level application window 104 comprises any display window that is visibly displayed (e.g., in a manner overlaying the desktop display of the operating system and/or one or more other application windows). For example, no other display window that may be presented at the display screen of device 100 may be interacted with by a user prior to the user interacting with top-level application window 104. In some embodiments, at one time at device 100, there is only one such top-level application window 104 and any other display windows that may be presented at the display screen of device 100 are not considered to be top-level. For example, top-level application window 104 is a display window of application program 102. In some embodiments, a user's speech-based interaction with a device such as device 100 is directed only at a top-level display window such as top-level application window 104. While the example of FIG. 1 shows a top-level display window being a top-level application window, the top-level display window with which a user may interact with via speech may also be a top-level system window. For example, a top-level system window is a dialog box that pops up, a status bar, and/or a navigation bar displayed on the user interface.

For example, operating system 106 can be iOS, Android, or YunOS or any other operating system that is capable of implementing speech-based interactions. In various embodiments, operating system 106 implements window manager service 108. In various embodiments, window manager service 108 is configured to determine which windows are visible at the display screen of device 100 and how they are laid out on the display screen. In various embodiments, window manager service 108 is configured to perform window transitions and animations when opening or closing an application. An application program or system program may display window contents on the display screen of a device by interacting with window manager service 108.

The modules and units described herein can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and units may be implemented on a single device or distributed across multiple devices.

Operating system 106 further includes speech service module 110, which includes speech management module 114, speech engine module 116, and window monitoring module 112. In various embodiments, window monitoring module 112 is configured to generate interface element information corresponding to each of at least a subset of all display windows (e.g., each application window and/or each system window) that have been presented at device 100. By monitoring the processing of window manager service 108 when any display window undergoes a change at the display screen of device 100, window monitoring module 112 records interface element information that is related to the affected display window. For example, as users manually interact with display windows that are presented at the display screen of device 100, window manager service 108 is configured to change the display of the windows at the display screen and by doing so, information such as which interface elements (e.g., buttons, fields, and/or other controls) existed in the affected display windows is monitored and recorded by window monitoring module 112.

In various embodiments, speech engine module 116 is configured to use speech recognition to convert received speech input information (which is input by a user) into an operation instruction and then send the operation instruction to speech management module 114. In various embodiments, an "operation instruction" comprises a text-based instruction that describes how an interface element of the top-level display window should be interacted with. For example, speech management module 114 is configured to first convert the user's speech input into text instruction and then convert the text instruction into an operation instruction through semantic analysis, matching, and other processing processes. Speech management module 114 is configured to send an operation request that includes the operation instruction to window monitoring module 112. In various embodiments, window monitoring module 112 is configured to query recorded interface element information that corresponds to the current top-level display window at device 100, top-level application window 104, to determine an interface element capable of responding to the operation instruction. Speech management module 114 is configured to use the operation instruction as a basis to send, via window manager service 108, a simulated manual selection event with respect to the determined interface element of top-level application window 104 to top-level application window 104 so that top-level application window 104 or application program 102 is caused to perform a corresponding operation/action associated with the interface element. In various embodiments, a "manual selection event" with respect to an interface element is a user selection via touch, clicking, or some other form of physical and not speech-based engagement with the interface element. Because this scheme employs simulating a manual selection event corresponding to an interface element of a display window that corresponds to a speech instruction, existing selection event processing logic corresponding to the interface element can be executed as if the interface element had been manually (e.g., via touch or by an input device such as a mouse or a stylus) activated/selected by a user. Thus, developers do not have to adapt computer program code associated with the application/system with which the display window is associated to accommodate speech as a new type of input. Put another way, various embodiments described herein do not require the creation of customized processing logic and/or computer program code to support the speech-based interface for each application but rather provides speech support from the system layer. As such, various embodiments described herein enable the reuse of existing computer program code and/or other processing logic with respect to executing actions/operations corresponding to activated interface elements of display windows, which may reduce developer workloads and may therefore spur the promotion and application of speech interaction on electronic devices.

Various embodiments described herein may be integrated into an operating system and provide speech support for various display windows, including application program windows (which are sometimes referred to as "application windows") and/or system program windows (which are sometimes referred to as "system windows") from the system layer. In some embodiments, speech-based interaction may be specifically implemented for a preset type of display window. For example, the display window of a preset type may be: an application window. In another example, the display window of a preset type may include: an application window and/or a system window. The number of display windows of a preset type may be one or more. To take the example of a smart mobile communication device, if the preset types include two window types, namely application windows and system windows, it is then possible to traverse the interface element information corresponding to the currently displayed status bar (one type of system window), the interface element information corresponding to the currently displayed navigation bar (another type of system window), and the interface element information corresponding to the currently displayed application window and to send a simulated manual selection event directed at an interface element corresponding to one of such display windows that is capable of responding to an operation instruction therein.

Figure 2:
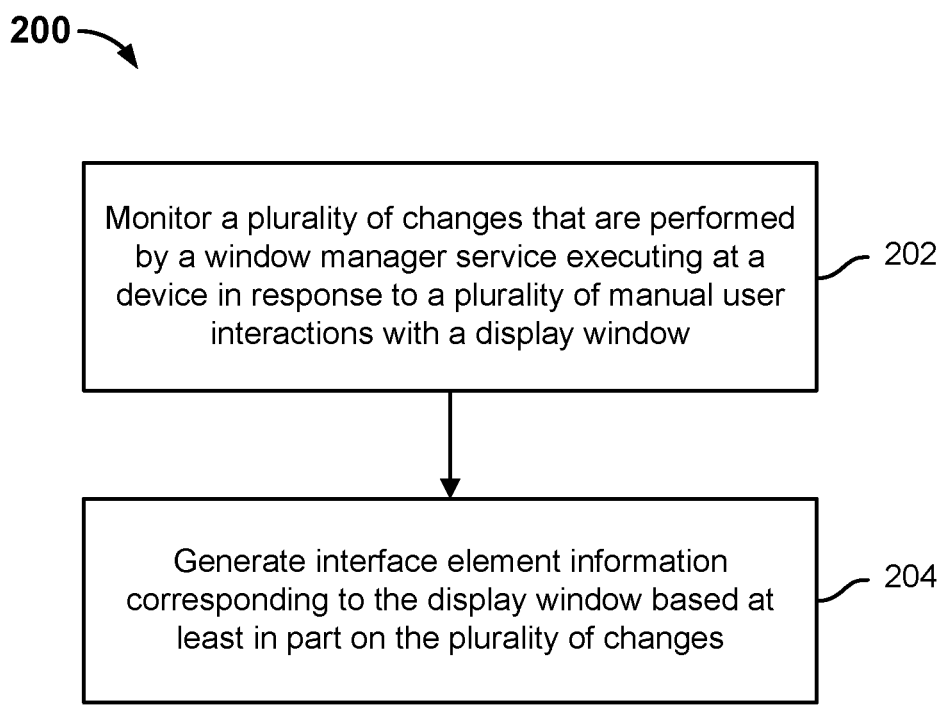
FIG. 2 is a flow diagram showing an example of a process for generating interface element information corresponding to a display window at a user interface.

FIG. 2 is a flow diagram showing an example of a process for generating interface element information corresponding to a display window at a user interface. In some embodiments, process 200 is implemented at device 100 of FIG. 1. Specifically, in some embodiments, process 200 is implemented, at least in part, by operating system 106 of device 100 of FIG. 1.

At 202, a plurality of changes that are performed by a window manager service executing at a device is monitored in response to a plurality of manual user interactions to a display window is monitored.

At 204, interface element information corresponding to the display window is generated based at least in part on the plurality of changes.

In some embodiments, interface element information contained in a top-level display (e.g., application) window may be recorded by monitoring the processing process of the window manager service when the display window undergoes a change. For example, the display window may undergo a change (e.g., become closed, display new content) in response to a user interaction with the display window (e.g., the user manually selects to close the window, the user selects a button at the window that causes the content at the window to refresh). For example, when an application program or a system program displays a window or exits a window, generally it will cause the display window to undergo a change, and generally the display effect following the change can be presented to the user only after the change process undergoes corresponding processing by the window manager service. Because the window manager service organizes and manages the windows at the device's display screen, processing that is performed by the service is able to identify information regarding each interface element of the display window (regardless of which interface element has been interacted with by the user). As such, by monitoring the processing of the window manager service with respect to changing a top-level display window, the interface elements of the display window can be obtained and included in interface element information that is generated for that particular display window.

For example, when a user wishes to display an application window in an application program (i.e., cause that window to become a top-level application window), a user interaction related to the display window may cause a request to be sent to the window manager service to trigger the window manager service to call the corresponding window display processing function. In some embodiments, computer program code that when executed cause monitoring to be performed may be added to the window display processing function to cause the function to send messages to the operating system and where the messages identify interface element information that relates to the top-level application window that is undergoing a change. The operating system may then record interface element information from the messages that identify the interface elements that are found in the top-level application window.

In various embodiments, interface elements that are found in display windows include operable controls such as, for example, buttons, menus/lists, and text input boxes. In various embodiments, interface element information corresponding to a display window includes one or more of the following: which interface elements are present at the display window, the types of interface elements that are present at the display window (e.g., which interface elements are buttons and which are dropdown menus), preset attribute values corresponding to each interface element, and interface element-identifying information. For example, interface element-identifying information may be interface element layout information, including the display position of each interface element on the display screen and the size/dimensions of each interface element. For example, interface element-identifying information may also include interface element IDs. The appropriate interface element-identifying information may be recorded according to the different specific forms that are included in the messages sent by the window manager service.

To give a first example of a menu/list control, its type may be a preset value corresponding to the "list" type. The preset attributes corresponding to this type may include: the number of list content items and/or the specific content of each item. List control-identifying information may be the control's display position on the screen and size information, or it may be a list control ID.

To give a second example of a button control, its type may be a preset value corresponding to the "button" type. The preset attributes corresponding to this type may include: the title content of the button. Button control-identifying information may be the control's display position on the screen and size information, or it may be a button control ID.

Figure 3:
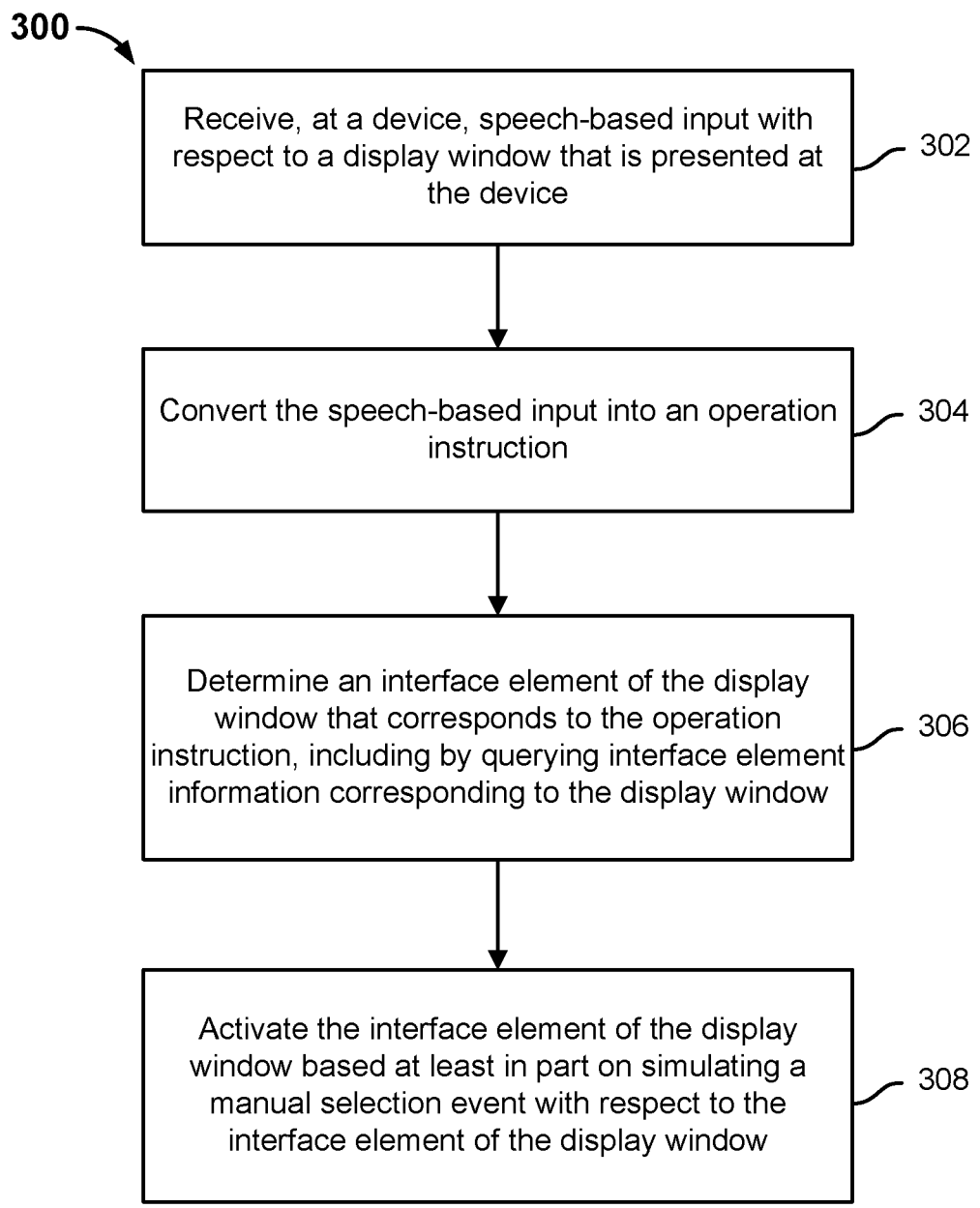
FIG. 3 is a flow diagram showing an embodiment of a process for providing speech-based interaction with a display window at a user interface.

FIG. 3 is a flow diagram showing an embodiment of a process for providing speech-based interaction with a display window at a user interface. In some embodiments, process 300 is implemented at device 100 of FIG. 1. Specifically, in some embodiments, process 300 is implemented, at least in part, by operating system 106 of device 100 of FIG. 1.

At 302, speech input with respect to a display window that is presented at a device is received at the device.

A speech input is captured at the device by a sensor such as a microphone. For example, the speech input comprises a recording of the user speaking a phrase or a sentence. In various embodiments, the speech input is received at the device while at least one display window is currently presented at the top-level of the display screen of the device. The speech input identifies at least an interface element and/or an attribute value thereof of the display window that should be activated.

At 304, the speech input is converted into an operation instruction.

The received speech input is first converted into text using speech recognition. The resulting text is then converted into an operation instruction through semantic analysis and template-based matching. As mentioned above, an operation instruction comprises a text-based instruction that identifies the interface element of a top-level display window that was determined from the speech input. In some embodiments, an operation instruction may include identifying information associated with an interface element and operation descriptive information. For example, "identifying information associated with an interface element" comprises an interface element ID, an interface element type (e.g., a list, a button, an input field), and/or any other information that can be used to uniquely identify the appropriate interface element of a top-level display window. For example, "operation descriptive information" comprises identifying information regarding which preset attribute value corresponding to the interface element to activate, a value to input into the interface element, and/or any other information that describes how the interface element that is determined by the "identifying information associated with an interface element" portion of the operation instruction is to be interacted with.

In a first example, a user says the following sentence that is captured by a microphone of the device: "Hello xyz, select the third one." Speech recognition is applied to the speech input to recognize the preset wake-up word "Hello xyz" corresponding to the speech-based interaction process at the device. Speech recognition also causes the speech input to be converted into text-based instruction information including: "select the third one." Next, semantic analysis is applied to the text to parse the instruction information into the phrases "select" and "the third one." By matching such phrases to predefined templates, the instruction information is translated into the following operation instruction: "identifying information associated with the interface element: list; operation descriptive information: 3." The "identifying information associated with the interface element: list" portion of the operation instruction may be inferred because the only type of interface element that would have multiple preset attribute values to select from is a list (e.g., a menu control).

In a second example, a user says the following sentence that is captured by a microphone of the device: "Select OK." Speech recognition is applied to the speech input to convert the speech input into text-based instruction information. Semantic analysis is then applied to the instruction information to parse the instruction information into the phrases "Select" and "OK." By matching such phrases to predefined templates, the instruction information is translated into the following operation instruction: "type of interface element operated on: button; operation descriptive information: OK." The "type of interface element operated on: button" portion of the operation instruction may be inferred because the only type of interface element that would have a preset attribute value of "OK" is a button.

At 306, an interface element of the display window that corresponds to the operation instruction is determined, including by querying interface element information corresponding to the display window.

In various embodiments, stored interface element information corresponding to the top-level display window is retrieved and queried for an interface element of the top-level display window that matches the operation instruction and is also capable of responding to the operation instruction. In some embodiments, interface element information corresponding to the top-level display window is determined using a process such as process 200 of FIG. 2.

For example, if the operation instruction is "type of interface element operated on: list; operation descriptive information: 3," the interface element information corresponding to the top-level application window is queried to determine whether there is an interface element of the top-level display window whose type is "list" and which has at least three preset attribute values in the list. If such an interface element exists, then the interface element is identified as the matching interface element that is capable of responding to the operation instruction.

For example, if the operation instruction is "type of interface element operated on: button; operation descriptive information: OK," the interface element information corresponding to the top-level application window is queried to determine whether there is an interface element of the top-level display window whose type is "button" and whose preset attribute value is "OK." If a matching interface element exists, then the interface element is identified as the matching interface element that is capable of responding to the operation instruction.

The examples described so far in process 300 refer to only one top-level display window, which may comprise an application window. For example, a mobile device or a device with a smaller screen may typically display only one top-level display window, which comprises an application window. However, process 300 may also apply to a scenario in which multiple top-level display windows exist. For example, a desktop device or a device with a larger screen may support multiple top-level display windows including for example: a status bar, an application window of an application that is in the foreground/in-use/active, and the navigation bar. For a scenario in which multiple top-level windows are currently presented at a display screen, process 300 may be applied by querying across the stored interface element information corresponding to each such top-level display window to determine a matching interface element that is capable of responding to the operation instruction.

If a matching interface element cannot be found in the stored interface element information corresponding to any of the top-level display windows, a corresponding prompt may be presented at the display screen of the device. For example, the prompt may be a pop-up window or recorded audio that informs the user that he or she must re-input the speech instruction and/or use another form of input.

At 308, the interface element of the display window is activated based at least in part on simulating a manual selection event with respect to the interface element of the display window.

In various embodiments, there is generally one matching interface element that is determined in 306 that is capable of responding to the operation instruction. A manual selection event on this matching interface element is used to activate the matching interface element. As mentioned above, in various embodiments, a "manual selection event" with respect to an interface element is a user selection via touch, clicking, or some other form of physical and non-speech-based interaction/engagement with the interface element. Because techniques described herein use voice or speech-based interaction with a display window, a manual selection event of an interface element of a display window needs to be simulated as the user is not physically engaging with the interface element. In various embodiments, simulating a manual selection event with respect to the matching interface element includes sending a message to the application, the program, or the system layer that is associated with the top-level display window or to the thread or process responsible for controlling management of the interface element, that the matching interface element should be activated. The application, the program, or the system layer that is associated with the top-level display window or to the thread or process responsible for controlling management of the matching interface element is configured to then perform one or more operations/actions with respect to the activated interface element. Process 400 of FIG. 4 describes an example implementation of step 308.

Figure 4:
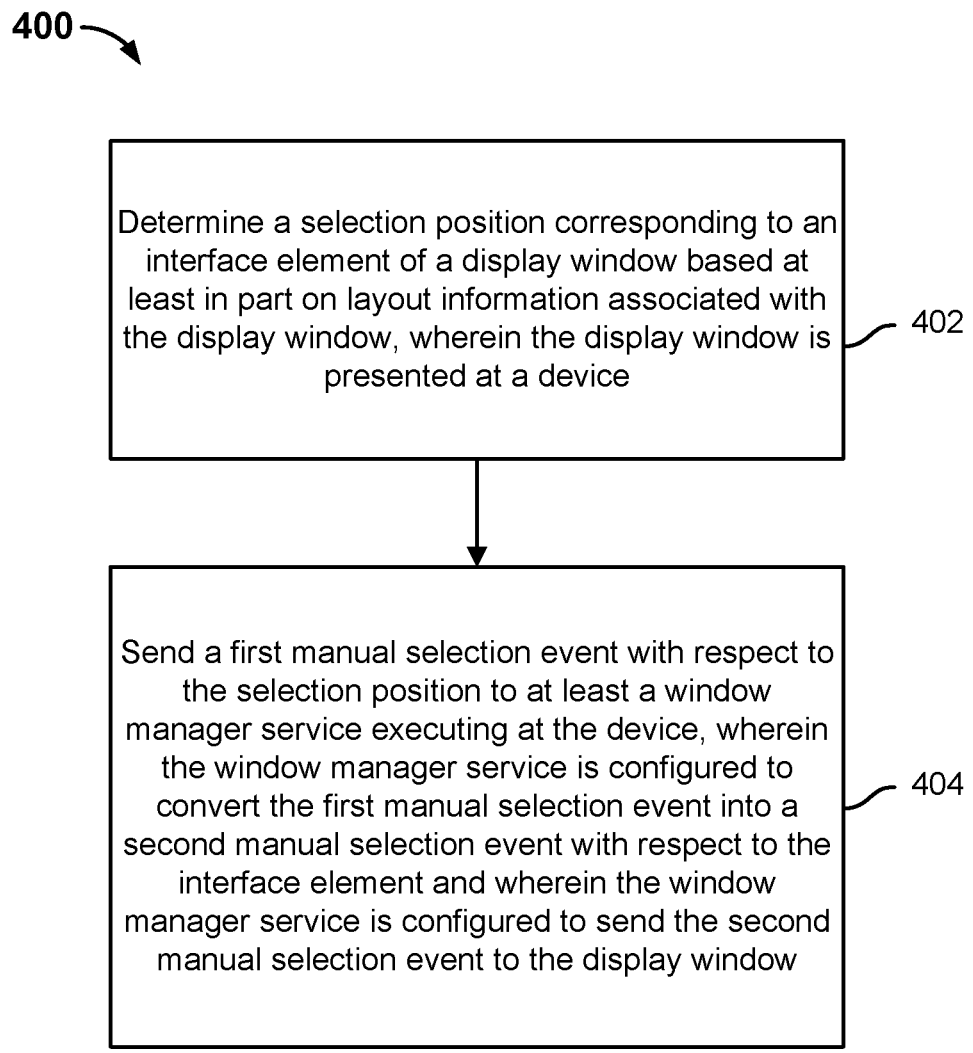
FIG. 4 is a flow diagram showing an example of a process for simulating a manual selection event with respect to an interface element of a display window.

FIG. 4 is a flow diagram showing an example of a process for simulating a manual selection event with respect to an interface element of a display window. In some embodiments, process 400 is implemented at device 100 of FIG. 1.

At 402, a selection position corresponding to an interface element of a display window is determined based at least in part on layout information associated with the display window, wherein the display window is presented at a device.

As mentioned above, stored interface element information corresponding to a display window includes for each element contained in the display window comprises: which interface elements are present at the display window, the types of interface elements that are present at the display window (e.g., which interface elements are buttons and which are dropdown menus), preset attribute values corresponding to each interface element, and interface element-identifying information. In particular, for example, interface element-identifying information associated with an interface element may be interface element layout information, including the position of each interface element on the display screen and the size/dimensions of each interface element. As such, the interface element information corresponding to the current top-level display window is retrieved to determine at least the display position and/or the dimensions of the interface element that had been determined to match the operation instruction that was derived from a user's speech input into the device (e.g., using a process such as process 300 of FIG. 3).

At 404, a first manual selection event with respect to the selection position is sent to at least a window manager service executing at the device, wherein the window manager service is configured to convert the first manual selection event into a second manual selection event with respect to the interface element and wherein the window manager service is configured to send the second manual selection event to the display window.

In a first example, the matching interface element is a button. The display region that the button occupies at the display screen of the device can be determined based on the display position of the button on the display screen and the size/dimensions of the button. The position (e.g., coordinate or location) of any one point (e.g., pixel) in the button's display region can be selected as the selection position corresponding to the button. For example, the center position of the button's display region may be selected as the selection touch position corresponding to the button.

In a second example, the interface element is a list. The display region of the third preset attribute value/item of the list interface element list may be determined using the layout information associated with the list. For example, the operation descriptive information in the operation instruction is: 3 (the third preset attribute value/item in the list is to be selected). That is, the simulated manual selection event should be directed at the third preset attribute value/item in the list. Therefore, the layout information associated with the list may be used to determine the display region of the third piece of content in the list. The position (e.g., coordinate or location) of any one point (e.g., pixel) in the display region of the third preset attribute value/item in the list may be selected as the selection position corresponding to the list. For example, the center position of the display region of the third preset attribute value/item in the list may be selected as the selection position corresponding to the list.

The determined selection position corresponding to the interface element is then sent to the operating system of the device as the selection position of a manual selection event that had occurred with respect to the display screen.

Generally, a manual selection event that is physically performed by the user on the display screen of the device with either a finger or a mouse (or other input device) will trigger an interruption, and the manual selection event will be written into the corresponding device node in the file system. For example, in the case of an electronic device that does not have a touchscreen, such as a personal computer, the manual input device may be a mouse. For example, an actual manual selection event is a user touching/pressing a finger against a touchscreen input device. In another example, an actual manual selection event is a user pressing down on a mouse input device. An actual manual selection event, generally, is reported to the operating system, which then issues the event to the window manager service. The window manager service in turn issues the manual selection event to the display window and/or its application or system layer for processing.

In various embodiments, there is no manual selection that is actually physically input by the user into the device but rather, a speech input from the user is captured and then mapped to an interface element of a top-level display window that is currently presented at the display screen of the device. Specifically, the speech input is converted into a text-based operation instruction that is used to simulate a user's manual selection event with respect to the interface element of the display window that is identified from the speech input. The interface element is therefore activated and one or more operations/actions that would have conventionally been performed had the user actually physically selected the interface element are now performed as a result of the simulated manual selection event. As such, various embodiments leverage existing processing logic and/or computer program code that is conventionally executed in response to the activations of interface elements at a display window by simply simulating the manual selection event that causes such logic/code to execute based on a speech input instead of requiring a user's physical selection to cause such events to be generated.

Taking an Android operating system based on the Linux kernel as an example, a "sendevent" command provided by the Android operating system may be used to send a manual selection event to the device node corresponding to the manual input device. For example, the following instructions may be sent to a device node: first send a "sendevent" instruction designating a simulated manual screen selection position and include the coordinate values corresponding to the simulated manual selection position determined at step 402; then send the "sendevent" command corresponding to the press-down action (i.e., generally the "down" action) in the simulated manual selection operation; lastly, send the "sendevent" command corresponding to a raise-up action (i.e., generally the "up" action) in the simulated manual selection operation. For example, the press-down action and the raise-up action may respectively correspond to a user's manual pressing down and lifting up of his or her finger on either a touchscreen input or a mouse device. Sending the instructions described above completely simulates one simulated manual selection operation directed at the selection position.

After the operating system issues the received simulated manual selection event to the window manager service, in various embodiments, the window manager service uses the selection position that is included in the received simulated manual selection event as a basis to convert the received simulated manual selection event into a manual selection event that is directed at the interface element, and it sends the manual selection event that is directed at the interface element to the top-level display window, which will cause the top-level display window to activate the interface element and perform one or more operations that are to be performed in response to the activation of the interface element.

For example, the operation instruction is "type of interface element operated on: list; operation descriptive information: 3." Based on the operation instruction and the stored interface element information corresponding to the currently presented top-level display window, the selection position associated with the third preset attribute value/item in the list interface element is determined to be at position (x, y). A simulated manual selection event directed to the third preset attribute value/item in the list interface element in the top-level display window is generated and sent to the top-level display window (or its corresponding application program or system layer) to trigger the top-level application window (or its corresponding application program or system layer) to execute the corresponding processing operation(s) associated with the activation of the third preset attribute value/item in the list interface element. That is, the top-level display window is caused to execute the manual selection event processing function that follows the activation of the third preset attribute value/item in the list interface element. For example, the top-level display window is a media player window, which includes a playlist of songs. The top-level application window, using the received simulated manual selection event that is determined based on the speech input as a basis to execute the corresponding manual selection event processing function, will play the third song in the playlist and therefore complete the speech-based interactive process.

While process 400 described above describes an example process of sending a simulated manual selection event to the device's operating system, which then sends the manual selection event to a window manager service, which ultimately sends a manual selection event to the top-level display window, another example process using a simulated manual selection event includes sending a simulated manual selection event directly to the top-level display window, thereby bypassing the window manager service. Specifically, in this alternative example process of directly sending a simulated manual selection event, the simulated manual selection event may include the following information: the ID of the interface element (e.g., list ID) and operation descriptive information in the operation instruction (e.g., list ID and 3, indicating the third preset attribute value/item in the corresponding list). For example, the ID of the interface element could be obtained from the interface element information corresponding to the top-level display window. The top-level display window would use the received simulated manual selection event as a basis to execute the manual selection event processing function directed at the matching interface element that corresponds to the speech information that was input.

If the number of interface elements that are determined to match the operation instruction is equal to one, then, in some embodiments, either of the two approaches (sending a simulated manual selection event to an operating system or directly sending a simulated manual selection event to a top-level display window) described above may be used to cause the one interface element to be activated. If the number of interface elements that is determined to match the operation instruction is greater than or equal to 2, either of the two approaches (sending a simulated manual selection event to an operating system or directly sending a simulated manual selection event to a top-level display window) described above can be executed for each such interface element to send a simulated manual selection event to the top-level display window and thus trigger the corresponding window to execute the corresponding operations associated with each activated interface element. Alternatively, only one interface element that has been determined to match the operation instruction can be selected (e.g., in accordance with a preset selection technique) and then either of the two approaches described above may be used to send the manual selection event to the window associated with the selected interface element. For example, selecting an interface element in accordance with a preset selection technique may include selecting an interface element in a preset position (within the display screen of the device) based on the already determined layout of all the interface elements, e.g., selecting an interface element at the very top of the display screen or selecting an interface element that is closest to the left edge of the display screen. In another example, selecting an interface element in accordance with a preset selection technique may include alerting the user by playing a prerecorded speech audio to prompt the user to select one of the matching interface elements based on the result of the speech recognition performed on the user's input speech.

Examples of speech-based interaction described thus far in various embodiments are implemented by a speech service module in an operating system (e.g., speech service module 110 of operating system 106 of device 100 of FIG. 1). In some embodiments, the functions of the speech service module are split across multiple function modules. Specific examples are given below in FIGS. 5, 6, and 7. In other implementations, the function implemented by each function module may be different from described herein. Or the modules may be split in other ways that differ from what is described herein.

Please note that the most of the examples of speech-based interaction described thus far provide speech support to a top-level application window in a scenario where there is only one top-level application window. This may be extended in other implementations on the basis of the same principles. For example, speech support may be provided for a top-level system window or for multiple top-level display windows displayed at the same time. In the case of the former, the interface element information corresponding to the top-level system window may be recorded in advance. After received speech input is converted into an operation instruction, a query is directed at the top-level system window so as to determine the interface element capable of responding to the operation instruction and to send the corresponding simulated, manual selection event. In the case of the latter, the interface element information included in all the top-level display windows may be recorded in advance. After the received speech input is converted into an operation instruction, the interface element information that is recorded for each top-level display window is traversed so as to determine the matching interface element capable of responding to the operation instruction and the corresponding manual selection event is sent to the corresponding display windows.

Applying various embodiments described herein to Internet-connected vehicles will improve the safety of interacting with devices while driving since a driver that only needs to use his or her voice/speech to interact with a display window of a vehicle-mounted device can continue to maintain his or her hands on the steering wheel and eyes on the road.

The following example applies the speech-based interaction techniques in accordance to embodiments described herein to a vehicle-mounted electronic device on which a YunOS smart operating system is installed and which provides a navigation function: After a user activates the navigation feature while driving a car, the display screen displays a list of candidate navigation destinations. The user may directly say the following speech instruction information: "Select the fifth one" or "I want to go to xyz place." The speech-based interaction techniques in accordance to some embodiments that are implemented by the vehicle-mounted electronic device may then convert the received speech input into the following operation instruction: "type of interface element operated on: list; operation descriptive information: 5." Then the interface element information corresponding to the navigation application display window of the vehicle-mounted electronic device is queried to determine the matching interface element, which is the navigation destination list. A manual selection event corresponding to the fifth preset attribute value/item of the navigation destination list is simulated such that the fifth preset attribute value/item of the navigation destination list is activated as if the user had physically selected that interface element. As a result of the activation of the fifth preset attribute value/item of the navigation destination list, the navigation application of the vehicle-mounted electronic device proceeds to present navigation information to the destination associated with the fifth preset attribute value/item of the navigation destination list.

The following example applies the speech-based interaction techniques in accordance to embodiments described herein to a vehicle-mounted temperature control device on which a YunOS smart operating system is installed: While the user is driving, a top-level display window, a dialog box, pops up on the display screen of the vehicle-mounted temperature control device and asks the user if the air conditioning needs to be turned on. The dialog box presents two buttons that are respectively titled "OK" and "Cancel." The user may directly say the following speech instruction information to the device: "Choose OK" or "Agree." The speech-based interaction techniques in accordance to some embodiments that are implemented by the vehicle-mounted temperature control device may convert the received speech information into the following operation instruction: "type of interface element operated on: button; operation descriptive information: OK." Then the interface element information corresponding to the dialog box of the vehicle-mounted temperature control device is queried to determine the matching interface element, which is the button titled "OK." A manual selection event corresponding to the "OK" button is simulated on the dialog box such that the "OK" button is activated as if the user had physically selected that interface element. As a result of the activation of the "OK" button of the dialog box, the air conditioning is turned on in the vehicle.

As shown in the two examples described above, the speech-based interaction with display window techniques described herein may add convenience as well as safety in the field of Internet-connected cars by obviating the need for the driver to take his or her hands off of the steering wheel or eyes off the road to physically interact with a user interface of a vehicle-mounted device, in some instances. In particular, the speech-based interaction with a display window that is presented at a device as described herein is flexible because the user does not have to input speech in strict accordance with set parameters, but rather need only describe the relevant prompt information for the interface element of the top-level display window that he or she hopes to control.

Figure 5:
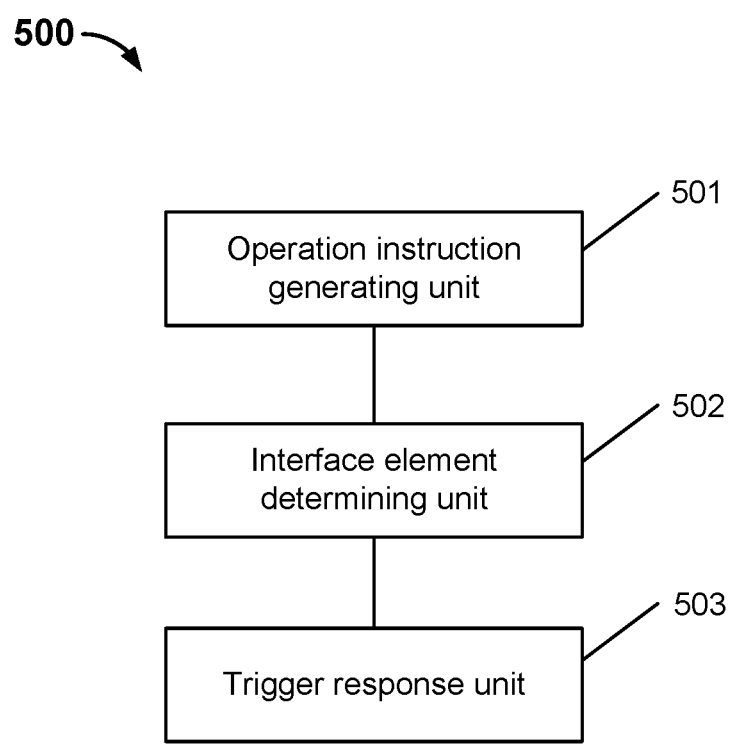
FIG. 5 is a diagram showing an embodiment of a speech-based interaction system.

FIG. 5 is a diagram showing an embodiment of a speech-based interaction system. In the example of FIG. 5, speech-based interaction system 500 includes: operation instruction generating unit 501, interface element determining unit 502, and trigger response unit 503.

Operation instruction generating unit 501 is configured to convert received speech input into an operation instruction. Interface element determining unit 502 is configured to query interface element information corresponding to the top-level display window to determine an interface element that matches the operation instruction. Trigger response unit 503 is configured to send a simulated manual selection event to activate the matching interface element of the display window.

In some embodiments, trigger response unit 503 is configured to use the operation instruction to determine a simulated manual selection event corresponding to the matching interface element to send to the display window to cause the display window to perform one or more operations/actions in response to the activation of the interface element.

In some embodiments, trigger response unit 503 comprises the following subunits:

A touch position determining subunit that is configured to determine the selection position corresponding to a matching interface element based at least in part on the layout information that is stored interface element information corresponding to the display window.

A simulated manual selection event reporting subunit that is configured to simulate a manual input device's (e.g., a touchscreen or a mouse) reporting of the simulated manual selection event with the determined selection position to the operating system.

A manual selection event sending subunit that is configured to convert a received simulated manual selection event that includes the selection position into a manual selection event directed at the interface element associated with the selection position and send this manual selection event to the display window associated with the matching interface element.

In some embodiments, speech-based interaction system 500 further includes a monitoring and recording unit that is configured to record interface element information associated with the display window by monitoring the changes that are applied to the display window by the window manager service.

Interface element determining unit 502 is configured to determine an interface element that matches the operation instruction by querying interface element information corresponding to the display window and recorded by the monitoring and recording unit.

In some embodiments, operation instruction generating unit 501 comprises:

A speech recognition subunit that is configured to convert received speech input through speech recognition into a text-based instruction.

A speech analysis and matching subunit that is configured to convert the text-based instruction into an operation instruction through semantic analysis and a template-based matching analysis.

In some embodiments, interface element determining unit 502 is configured to determine an interface element in a top-level application window that is capable of responding to the operation instruction by querying interface element information corresponding to the top-level application window.

In some embodiments, interface element determining unit 502 is configured to determine an interface element capable of responding to the operation instruction by traversing interface element information corresponding to each display window, if there is more than one top-level display window.

In some embodiments, speech-based interaction system 500 further includes an interface element selecting unit that is configured to select one interface element from among multiple matching interface elements according to a preset selection technique when the number of interface elements determined by interface element determining unit 502 is greater than or equal to 2.

Trigger response unit 503 is configured to simulate a manual selection event to cause the interface element to respond to the operation instruction.

In some embodiments, speech-based interaction system 500 is part of an electronic device that has a speech input device and a display screen.

Figure 6:
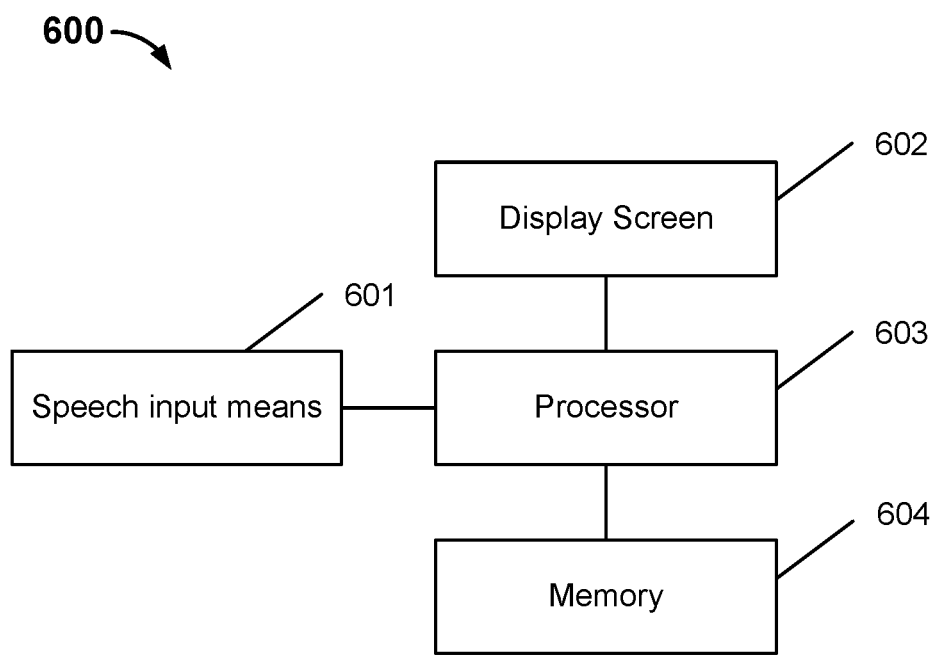
FIG. 6 is a diagram showing an embodiment of a device.

FIG. 6 is a diagram showing an embodiment of a device. In the example of FIG. 6, device 600 includes: speech input means 601, display screen 602, processor 603, and memory 604.

Memory 604 is configured to store instructions. Processor 603 is configured to read the instructions that are stored at memory 604.

Processor 603 is configured to convert received speech input into an operation instruction, determine a matching interface element by querying interface element information corresponding to the display window, and activate the interface element of the display window based at least in part on simulating a manual selection event with respect to the interface element of the display window.

In some embodiments, processor 603 is configured to simulate a manual selection event to activate the determined interface element based at least in part on using the operation instruction as a basis to generate a simulated manual selection event that is to be sent to the display window to cause the display window to perform operation(s) associated with an activation of the interface element.

Processor 603 is configured to execute the following for each matching determined interface element: determine a selection position corresponding to the interface element at least according to layout information of the interface element, simulate a manual input device reporting a manual selection event with the selection position to the operating system, and cause the window manager service to convert the manual selection event with the selection position into a manual selection event directed to the interface element and send the manual selection event directed to the interface element to the display window.

In some embodiments, processor 603 is configured to record interface element information associated with the display window by monitoring the changes that are applied to the display window by the window manager service.

Figure 7:
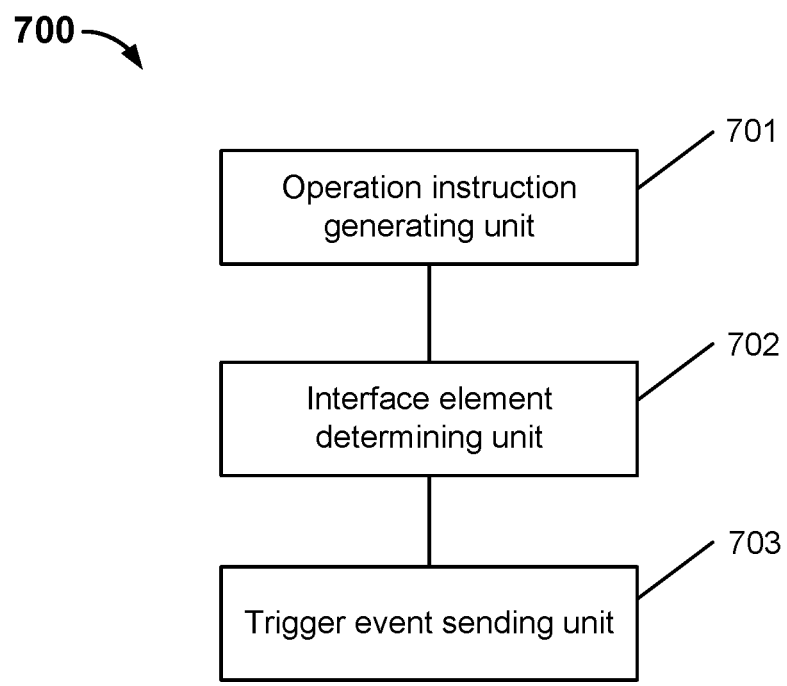
FIG. 7 is a diagram showing an embodiment of a speech-based interaction operating system.

FIG. 7 is a diagram showing an embodiment of a speech-based interaction operating system. In the example of FIG. 7, speech-based interaction operating system 700 includes: operation instruction generating unit 701, interface element determining unit 702, and trigger event sending unit 703.

Operation instruction generating unit 701 is configured to convert received speech input into an operation instruction. Interface element determining unit is 702 is configured to determine a matching interface element by querying interface element information corresponding to the display window. Trigger event sending unit 703 is configured to activate the interface element of the display window based at least in part on simulating a manual selection event with respect to the interface element of the display window.

In some embodiments, trigger event sending unit 703 is configured to simulate a manual selection event to activate the determined interface element based at least in part on using the operation instruction as a basis to generate a simulated manual selection event that is to be sent to the display window to cause the display window to perform operation(s) associated with an activation of the interface element.

In some embodiments, trigger event sending unit 703 further comprises the following subunits:

A touch position determining subunit that is configured to determine a selection position corresponding to the interface element based at least in part on layout information associated with the display window.

A simulated manual selection event reporting subunit that is configured to simulate a manual input device reporting a manual selection event with the selection position to the operating system.

A manual selection event sending subunit associated with a window manager service that is configured to convert the received manual selection event with the selection position into a manual selection event directed at the interface element and whereby the manual selection event sending subunit is configured to send the manual selection event to the display window associated with the interface element.

In some embodiments, operating system 700 further comprises:

A monitoring and recording unit that is configured to record interface element information associated with the display window by monitoring the changes that are applied to the display window by the window manager service.

Interface element determining unit 702 is configured to determine an interface element capable of responding to the operation instruction by querying interface element information corresponding to the display window and that was recorded by the monitoring and recording unit.

Although the present application uses preferred embodiments to disclose the above, they are not used to limit the present application. Any person skilled in the art may make possible changes and modifications without departing from the spirit and scope of the present application. Therefore, the scope of protection of the present application shall be the scope delimited by the claims of the present application.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media does not include non-temporary computer-readable media (transitory media) such as modulated data signals and carrier waves.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
one or more processors configured to:
monitor and record a plurality of changes that are performed by a window manager service in response to a plurality of manual user interactions with a display window;
generate interface element information corresponding to the display window based at least in part on the recorded plurality of changes, wherein the interface element information includes which one or more interface elements are present within the display window;
receive, at the device, speech input with respect to the display window that is presented at the device;
convert the speech input into an operation instruction;
determine an interface element of the display window that corresponds to the operation instruction, including by querying the interface element information corresponding to the display window; and
activate the interface element of the display window based at least in part on simulating a manual selection event with respect to the interface element of the display window, including to:
determine layout information corresponding to the interface element of the display window from the interface element information corresponding to the display window, wherein the layout information corresponding to the interface element describes a display region of the interface element;
determine a selection position corresponding to the interface element based at least in part on the layout information corresponding to the display window, wherein the selection position comprises a position within the display region of the interface element; and
send a first manual selection event with respect to the selection position to at least the window manager service, wherein the window manager service is configured to convert the first manual selection event into a second manual selection event with respect to the interface element and wherein the window manager service is configured to send the second manual selection event to the display window; and
one or more memories coupled to the one or more processors and configured to provide the one or more processors with instructions.

2. The device of claim 1, wherein the speech input is received via a sound-based sensor.

3. The device of claim 1, wherein the operation instruction comprises identifying information associated with the interface element and operation descriptive information.

4. The device of claim 1, wherein to convert the speech input into the operation instruction comprises to apply speech recognition to the speech input to convert the speech input into text.

5. The device of claim 1, wherein the layout information associated with the display window is included in the interface element information corresponding to the display window.

6. The device of claim 1, wherein to determine the selection position corresponding to the interface element based at least in part on the layout information associated with the display window comprises to:
use the layout information associated with the display window to determine the display region corresponding to the interface element; and
select the position within the display region corresponding to the interface element as the selection position corresponding to the interface element.

7. The device of claim 1, wherein to activate the interface element of the display window comprises to send the simulated manual selection event to the display window.

8. The device of claim 1, wherein the interface element comprises one or more of the following: a button, a list, a menu, and an input field.

9. A method, comprising:
monitoring and recording a plurality of changes that are performed by a window manager service in response to a plurality of manual user interactions with a display window;
generating interface element information corresponding to the display window based at least in part on the recorded plurality of changes, wherein the interface element information includes which one or more interface elements are present within the display window;
receiving speech input with respect to the display window that is presented at a device;
converting the speech input into an operation instruction;
determining an interface element of the display window that corresponds to the operation instruction, including by querying the interface element information corresponding to the display window; and
activating the interface element of the display window based at least in part on simulating a manual selection event with respect to the interface element of the display window, including by:
determining layout information corresponding to the interface element of the display window from the interface element information corresponding to the display window, wherein the layout information corresponding to the interface element describes a display region of the interface element;
determining a selection position corresponding to the interface element based at least in part on the layout information corresponding to the display window, wherein the selection position comprises a position within the display region of the interface element; and
sending a first manual selection event with respect to the selection position to at least the window manager service, wherein the window manager service is configured to convert the first manual selection event into a second manual selection event with respect to the interface element and wherein the window manager service is configured to send the second manual selection event to the display window.

10. The method of claim 9, wherein the speech input is received via a sound-based sensor.

11. The method of claim 9, wherein the operation instruction comprises identifying information associated with the interface element and operation descriptive information.

12. The method of claim 9, wherein converting the speech input into the operation instruction comprises applying speech recognition to the speech input to convert the speech input into text.

13. The method of claim 9, wherein the layout information associated with the display window is included in the interface element information corresponding to the display window.

14. The method of claim 9, wherein determining the selection position corresponding to the interface element based at least in part on the layout information associated with the display window comprises:

using the layout information associated with the display window to determine the display region corresponding to the interface element; and
selecting the position within the display region corresponding to the interface element as the selection position corresponding to the interface element.

15. The method of claim 9, wherein activating the interface element of the display window comprises sending the simulated manual selection event to the display window.

16. A computer program product, the computer program product being embodied in a non-transitory computer readable storage medium and comprising computer instructions for:
monitoring and recording a plurality of changes that are performed by a window manager service in response to a plurality of manual user interactions with a display window;
generating interface element information corresponding to the display window based at least in part on the recorded plurality of changes, wherein the interface element information includes which one or more interface elements are present within the display window;
receiving speech input with respect to the display window that is presented at a device;
converting the speech input into an operation instruction;
determining an interface element of the display window that corresponds to the operation instruction, including by querying the interface element information corresponding to the display window; and
activating the interface element of the display window based at least in part on simulating a manual selection event with respect to the interface element of the display window, including by:
determining layout information corresponding to the interface element of the display window from the interface element information corresponding to the display window, wherein the layout information corresponding to the interface element describes a display region of the interface element;
determining a selection position corresponding to the interface element based at least in part on the layout information corresponding to the display window, wherein the selection position comprises a position within the display region of the interface element; and
sending a first manual selection event with respect to the selection position to at least the window manager service, wherein the window manager service is configured to convert the first manual selection event into a second manual selection event with respect to the interface element and wherein the window manager service is configured to send the second manual selection event to the display window.

17. The computer program product of claim 16, wherein the operation instruction comprises identifying information associated with the interface element and operation descriptive information.

18. The computer program product of claim 16, wherein converting the speech input into the operation instruction comprises applying speech recognition to the speech input to convert the speech input into text.

* * * * *